United States Patent
Huang et al.

(10) Patent No.: US 11,603,320 B2
(45) Date of Patent: Mar. 14, 2023

(54) PREPARATION METHOD AND APPLICATION OF TETRAGONAL NAV₂O₅H₂O NANOSHEET-LIKE POWDER

(71) Applicant: Shaanxi University of Science and Technology, Shaanxi (CN)

(72) Inventors: Jianfeng Huang, Shaanxi (CN); Wenbin Li, Shaanxi (CN); Liyun Cao, Shaanxi (CN); Liangliang Feng, Shaanxi (CN); Shuwei He, Shaanxi (CN); Yijie Ren, Shaanxi (CN); Ruizi Li, Shaanxi (CN); Xunwei Chang, Shaanxi (CN)

(73) Assignee: Shaanxi University of Science and Technology, Shaanxi (CN)

( * ) Notice: Subject to any disclaimer, the term of this patent is extended or adjusted under 35 U.S.C. 154(b) by 249 days.

(21) Appl. No.: 17/151,671

(22) Filed: Jan. 19, 2021

(65) Prior Publication Data
US 2021/0139343 A1    May 13, 2021

Related U.S. Application Data

(62) Division of application No. 16/202,002, filed on Nov. 27, 2018, now Pat. No. 10,954,136.

(30) Foreign Application Priority Data

Feb. 6, 2018  (CN) .......................... 201810118844.4

(51) Int. Cl.
C01G 31/02 (2006.01)
H01M 4/485 (2010.01)
C01G 31/00 (2006.01)
H01M 4/02 (2006.01)

(52) U.S. Cl.
CPC ............. *C01G 31/02* (2013.01); *C01G 31/00* (2013.01); *H01M 4/485* (2013.01); *C01P 2002/72* (2013.01); *C01P 2004/03* (2013.01); *C01P 2004/04* (2013.01); *C01P 2004/24* (2013.01); *C01P 2004/30* (2013.01); *C01P 2006/40* (2013.01); *H01M 2004/027* (2013.01)

(58) Field of Classification Search
None
See application file for complete search history.

*Primary Examiner* — Colin W. Slifka (57) ABSTRACT

A preparation method of a tetragonal $NaV_2O_5 \cdot H_2O$ nanosheet-like powder includes steps of: (Step 1) simultaneously adding $NaVO_3$ and $Na_2S \cdot 9H_2O$ into deionized water, and then magnetically stirring, and obtaining a black turbid solution; (Step 2) sealing after putting the black turbid solution into an inner lining of a reaction kettle, fixing the sealed inner lining in an outer lining of the reaction kettle, placing the reaction kettle into a homogeneous reactor, and then performing a hydrothermal reaction; and (Step 3) after completing the hydrothermal reaction, naturally cooling the reaction kettle to the room temperature, and then alternately cleaning through water and alcohol, and then collecting a product, drying the product, and finally obtaining the tetragonal $NaV_2O_5 \cdot H_2O$ nanosheet-like powder with a thickness in a range of 30-60 nm and a single crystal structure grown along a (002) crystal orientation.

4 Claims, 6 Drawing Sheets

PREPARATION METHOD AND APPLICATION OF TETRAGONAL NAV$_2$O$_5$H$_2$O NANOSHEET-LIKE POWDER

CROSS REFERENCE OF RELATED APPLICATION

This is a divisional application of U.S. patent application Ser. No. 16/202,002, now U.S. Pat. No. 10,954,136, filed Nov. 27, 2018.

BACKGROUND OF THE PRESENT INVENTION

Field of Invention

The present invention relates to a NaV$_2$O$_5$.H$_2$O powder and a preparation method thereof, and more particularly to a tetragonal NaV$_2$O$_5$.H$_2$O nanosheet-like powder and preparation method and application thereof.

Description of Related Arts

Rechargeable lithium ion batteries are considered to be a promising large-scale energy storage technology due to their outstanding memoryless effect, low self-discharge effect, high energy/power density, long service life and friendly environment. In order to meet the needs of high-performance portable electronic devices and electric vehicles, graphite-like layered materials are gradually developed due to their highly-efficient interlayer ion transport, large specific surface area (facilitating improving ion adsorption) and rapid surface redox reaction; cause a lot of attention; and are considered to be the next generation of advanced lithium ion batteries. As a typical layered material, vanadium-based oxides with changeable chemical valences, rich source and low cost are regarded as a high-performance electrode material and have attracted much attention in the field of energy storage [Liu P, Zhu K, Gao Y, Luo H, Lu L. Recent Progress in the Applications of Vanadium-Based Oxides on Energy Storage: from Low-Dimensional Nanomaterials Synthesis to 3D Micro/Nano-Structures and Free-Standing Electrodes Fabrication. Adv Energy Mater. 2017: 1700547.]. Among various vanadium-based oxides, vanadium oxide (such as V$_2$O$_5$, VO$_2$ and V$_2$O$_3$) with excellent electrochemical reversibility has been extensively studied as a lithium ion battery electrode material, but low ion diffusion coefficient and unstable structure caused by small interlayer spacing and weak interlayer VDW (van der Waals' force) limit their further development. Therefore, layered vanadates with large interlayer spacing and strong chemical bonding between layers (interlayer metal ions or NH$_4^+$ action) are gradually gaining attention because these advantages can make the layered vanadates show up more Li$^+$ storage, better electrochemical power and a more stable layered structure during charging and discharging. Until now, most of the reported vanadates are lithium vanadate, and a large number of studies have confirmed that interlayer Li$^+$ can increase the interlayer space and stabilize the interlayer structure, so that the lithium vanadate exhibits superior electrochemical performance. However, the smaller radius of Li$^+$ makes the enhancement effect limited, which motivates researchers to look for vanadates with larger radius metal cations.

It is well known that Na$^+$ has a larger radius than Li$^+$, which makes sodium vanadate very suitable as an electrode material for lithium ion storage. In fact, some sodium vanadate with a layered structure (such as Na$_x$V$_2$O$_5$ (x=0.00, 0.005, 0.01, or 0.02), β-Na$_{0.33}$V$_2$O$_5$, NaVO$_2$, NaVO$_3$, and NaV$_3$O$_8$) have been reported to be a very promising lithium ion battery electrode material, and studies have shown that the insertion of Na$^+$ can extend the Li$^+$ diffusion channel to further improve the electrochemical performance. At the same time, the insertion of more Na$^+$ further expands the interlayer space, so that NaV$_2$O$_5$ is regarded as a more promising lithium ion battery electrode material. Unfortunately, the previous researches on NaV$_2$O$_5$ mainly focused on the positive electrode material of the sodium ion battery. As far as we know, the research on the negative electrode material of the sodium ion battery has never been reported [Muller-Bouvet D, Baddour-Hadj can R, Tanabe M, Huynh LTN, Le MLP, Pereira-Ramos JP. Electrochemically formed α'-NaV$_2$O$_5$: A new sodium intercalation compound. Electrochim Acta. 2015; 176: 586-93.]. Even so, it is urgent and challenging for further increasing sodium vanadate interlayer space. In recent years, studies on aqueous vanadium-based oxides have shown that interlayer water can effectively promote electrochemical stability and reversibility, expand the interlayer space to accommodate more Li$^+$, and improve ion migration (electrostatic shielding). In addition, most of the reported preparation methods of NaV$_2$O$_5$ (including solid phase method and hydrothermal method) have some disadvantages such as relatively high temperature, lengthy preparation process, and uncontrolled morphology (micrometer scale).

SUMMARY OF THE PRESENT INVENTION

An object of the present invention is to provide a tetragonal NaV$_2$O$_5$.H$_2$O nanosheet-like powder and a preparation method and an application thereof. The preparation method is simple, efficient and widely used.

To achieve the above object, the present invention provides a preparation method of a tetragonal NaV$_2$O$_5$.H$_2$O nanosheet-like powder used as an anode material of a lithium ion battery, which comprises the steps of:

(Step 1) simultaneously adding 0.8-1.2 g of NaVO$_3$ and 0.5-3.5 g of Na$_2$S.9H$_2$O into 55-65 ml of deionized water, and then magnetically stirring, and obtaining a black turbid solution;

(Step 2) sealing after putting the black turbid solution into an inner lining of a reaction kettle according to a filling ratio in a range of 55-65%, fixing the sealed inner lining in an outer lining of the reaction kettle, placing the reaction kettle into a homogeneous reactor, and then heating under a rotational speed in a range of 5-15 r/min from a room temperature to 150-200° C., and then performing a hydrothermal reaction; and (Step 3) after completing the hydrothermal reaction, naturally cooling the reaction kettle to the room temperature, and then alternately cleaning through water and alcohol, and then collecting a product, drying the product at 40-80° C., and finally obtaining the tetragonal NaV$_2$O$_5$.H$_2$O nanosheet-like powder.

Preferably, in the step of (Step 1), the magnetic stirring is performed for 55-65 min under a rotational speed in a range of 800-1000 r/min.

Preferably, in the step of (Step 2), the hydrothermal reaction is performed for 1-36 h.

Preferably, in the step of (Step 3), the alternate cleaning is performed by suction filtration or centrifugation for 3-6 times, and the collecting is performed by suction filtration or centrifugation.

The tetragonal NaV$_2$O$_5$.H$_2$O nanosheet-like powder prepared by the preparation method provided by the present invention has a thickness in a range of 30-60 nm and a layer spacing of 7.71 Å, and is a single crystal layered structure grown along a (002) crystal orientation, so that the nanosheet-like powder has a larger layer spacing and a stable layered structure.

The tetragonal $NaV_2O_5.H_2O$ nanosheet-like powder prepared by the preparation method provided by the present invention is able to be applied to the lithium ion field. When the nanosheet-like powder acts as an anode material of a lithium ion battery, at a current density of 100, 200, 500, 1000 and 2000 $mAg^{-1}$, a specific capacity is able to reach 348, 285, 209, 167 and 130 $mAhg^{-1}$, respectively; at the current density of 100 and 200 $mAg^{-1}$, a first discharge capacity is able to reach 859 and 633 $mAhg^{-1}$, respectively; after 480 and 600 cycles, the specific capacity is still able to reach 483 and 320 $mAhg^{-1}$, respectively; and after 1000 cycles at the current density of 1000 $mAg^{-1}$, the specific capacity is able to reach 129 $mAhg^{-1}$.

The present application firstly proposes a simple and efficient hydrothermal method. By using $Na_2S.9H_2O$ as a reducing agent, the universality preparation of the tetragonal $NaV_2O_5.H_2O$ nanosheet-like powder is realized under a wide range of conditions. Using sodium vanadate as the electrode material of the lithium ion battery has two advantages: on the one hand, $Na^+$ acts as a connecting bridge of the V—O layer to well stabilize the layered structure, so as to further improve the cycle stability; on the other hand, the introduction of the interlayer $H_2O$ molecule greatly expands an interlayer space of $NaV_2O_5$, and at the same time, the positive electricity of $Na^+$ is shielded to some extent (reducing the resistance of $Li^+$ diffusion between layers), which is beneficial to increase the capacity and enhance the electrochemical reaction power. Therefore, the tetragonal $NaV_2O_5.H_2O$ is a very promising anode material for lithium ion batteries.

The high-purity tetragonal $NaV_2O_5.H_2O$ nanosheet-like powder is synthesized by a one-step low temperature hydrothermal method, which has a simple reaction process, a wide range of synthesis and low temperature, is easily controlled and has no need for large equipment or harsh reaction conditions. While being applied as an anode material of a lithium ion battery, the above product shows excellent lithium storage performance.

Beneficially effects of the present invention are as follows.

(1) The $NaV_2O_5.H_2O$ nanosheet-like powder provided by the present invention has a new tetragonal phase crystal structure, a card matching an XRD (X-ray diffraction) pattern of the nanosheet-like powder is unable to be found in the known standard PDF card library, and the structure has never been reported in previous studies on $NaV_2O_5$.

(2) The $NaV_2O_5.H_2O$ nanosheet-like powder provided by the present invention has a larger layer spacing (namely, 7.71 Å), which is able to provide more active sites for $Li^+$ storage, so as to further increase a capacity of $NaV_2O_5.H_2O$; and simultaneously, is able to provide a smoother path for charge transfer, so as to further improve electrochemical reaction power, all of which are able to greatly promote an improvement of an electrochemical performance of $NaV_2O_5.H_2O$.

(3) The $NaV_2O_5.H_2O$ nanosheet-like powder provided by the present invention has a special layered crystal structure; on the one hand, $Na^+$ between the layers is able to form a strong chemical bond with V-O for stabilizing the layered structure, so as to further improve a cycle stability; one the other hand, interlayer water is able to well shield a positive electricity of $Na^+$ and weaken a resistance of $Li^+$ to shuttle between layers, so as to further improve the electrochemical reaction power.

(4) The $NaV_2O_5.H_2O$ nanosheet-like powder provided by the present invention has a special nanosheet-like structure, which is able to not only provide more active sites for $Li^+$ storage, but also shorten a diffusion path of $Li^+$, accelerate charge transfer, and ultimately lead to an improved electrochemical performance.

(5) The $NaV_2O_5.H_2O$ nanosheet-like powder provided by the present invention exhibits single crystal characteristics and high crystallinity, which makes the nanosheet-like powder exhibit excellent structural stability and cycle stability during charging and discharging; and simultaneously, a single crystal structure with periodic regular arrangement is also beneficial to $Li^+$ transmission within crystal lattices, so as to further contribute to the improvement of the electrochemical reaction power.

(6) The $NaV_2O_5.H_2O$ nanosheet-like powder provided by the present invention exhibits high phase purity and microstructure purity and is a high purity material.

(7) The $NaV_2O_5.H_2O$ nanosheet-like powder provided by the present invention adopts $NaVO_3$ as a V raw material, $Na_2S.9H_2O$ as a S raw material, and deionized water as a solvent, all of which are common raw materials and solvents, cheap and easy to be obtained, low in cost, high in yield, and easy to realize industrial conversion.

(8) The present invention directly synthesizes the final product by adopting a one-step hydrothermal reaction, thereby having low synthetic temperature, wide synthetic conditions, simple synthetic route, no need for large equipment or harsh reaction conditions, easily controlled reaction, no need for post-treatment, and friendliness for environment. Therefore, it is suitable for large-scale production.

(9) The reaction time, ratio and temperature in the present invention have a decisive effect on the preparation of pure phase $NaV_2O_5.H_2O$ nanosheet-like powder. Excessively high and too low reaction time, reaction ratio and reaction temperature are not conducive to the preparation of pure phase $NaV_2O_5.H_2O$ nanosheet-like powder.

(10) While acting as an anode material of a lithium ion battery, the $NaV_2O_5.H_2O$ nanosheet-like powder provided by the present invention shows excellent electrochemical performance; at a current density of 100, 200, 500, 1000 and 2000 $mAg^{-1}$, a specific capacity is able to reach 348, 285, 209, 167 and 130 $mAhg^{-1}$, respectively; at the current density of 100 and 200 $mAg^{-1}$, a first discharge capacity is able to reach 859 and 633 $mAhg^{-1}$, respectively; after 480 and 600 cycles, the specific capacity is still able to reach 483 and 320 $mAhg^{-1}$, respectively; and after 1000 cycles at the current density of 1000 $mAg^{-1}$, the specific capacity is able to reach 129 $mAhg^{-1}$.

DETAILED DESCRIPTION OF THE PREFERRED EMBODIMENT

The present invention is further described with accompanying drawings in detail as follows.

First Embodiment

Step 1: Simultaneously add 1.0 g of $NaVO_3$ and 1.0 g of $Na_2S.9H_2O$ into 60 ml of deionized water, and then magnetically stir at a rotational speed of 1000 r/min for 55 min, and obtain a black turbid solution;

Step 2: Seal after putting the black turbid solution into an inner lining of a reaction kettle according to a filling ratio of 60%, fix the sealed inner lining in an outer lining of the reaction kettle, place the reaction kettle into a homogeneous reactor, and then heat under a rotational speed of 10 r/min from a room temperature to 180° C., and then perform a hydrothermal reaction for 24 h; and Step 3: After completing the hydrothermal reaction, naturally cool the reaction kettle to the room temperature, and then alternately clean for three times through water and alcohol by suction filtration, and then collect a product by suction filtration, dry the product at 60° C., and finally obtain a tetragonal $NaV_2O_5.H_2O$ nanosheet-like powder.

Second Embodiment

According to the second embodiment of the present invention, the hydrothermal reaction is performed for 1 h, and other conditions in the second embodiment are same as those in the first embodiment.

Third Embodiment

According to the third embodiment of the present invention, the hydrothermal reaction is performed for 3 h, and other conditions in the third embodiment are same as those in the first embodiment.

Fourth Embodiment

According to the fourth embodiment of the present invention, the hydrothermal reaction is performed for 6 h, and other conditions in the fourth embodiment are same as those in the first embodiment.

Fifth Embodiment

According to the fifth embodiment of the present invention, the hydrothermal reaction is performed for 12 h, and other conditions in the fifth embodiment are same as those in the first embodiment.

Sixth Embodiment

According to the sixth embodiment of the present invention, the hydrothermal reaction is performed for 36 h, and other conditions in the sixth embodiment are same as those in the first embodiment.

Seventh Embodiment

According to the seventh embodiment of the present invention, a mass ratio of $NaVO_3$ to $Na_2S.9H_2O$ is 1:0.5, and other conditions in the seventh embodiment are same as those in the first embodiment.

Eighth Embodiment

According to the eighth embodiment of the present invention, a mass ratio of $NaVO_3$ to $Na_2S.9H_2O$ is 1:1.5, and other conditions in the eighth embodiment are same as those in the first embodiment.

Ninth Embodiment

According to the ninth embodiment of the present invention, a mass ratio of $NaVO_3$ to $Na_2S.9H_2O$ is 1:2.0, and other conditions in the ninth embodiment are same as those in the first embodiment.

Tenth Embodiment

According to the tenth embodiment of the present invention, a mass ratio of $NaVO_3$ to $Na_2S.9H_2O$ is 1:3.5, and other conditions in the tenth embodiment are same as those in the first embodiment.

Eleventh Embodiment

According to the eleventh embodiment of the present invention, the hydrothermal reaction is performed at 120° C., and other conditions in the eleventh embodiment are same as those in the first embodiment.

Twelfth Embodiment

According to the twelfth embodiment of the present invention, the hydrothermal reaction is performed at 150° C., and other conditions in the twelfth embodiment are same as those in the first embodiment.

Thirteenth Embodiment

According to the thirteenth embodiment of the present invention, the hydrothermal reaction is performed at 200° C., and other conditions in the thirteenth embodiment are same as those in the first embodiment.

Figure 1:
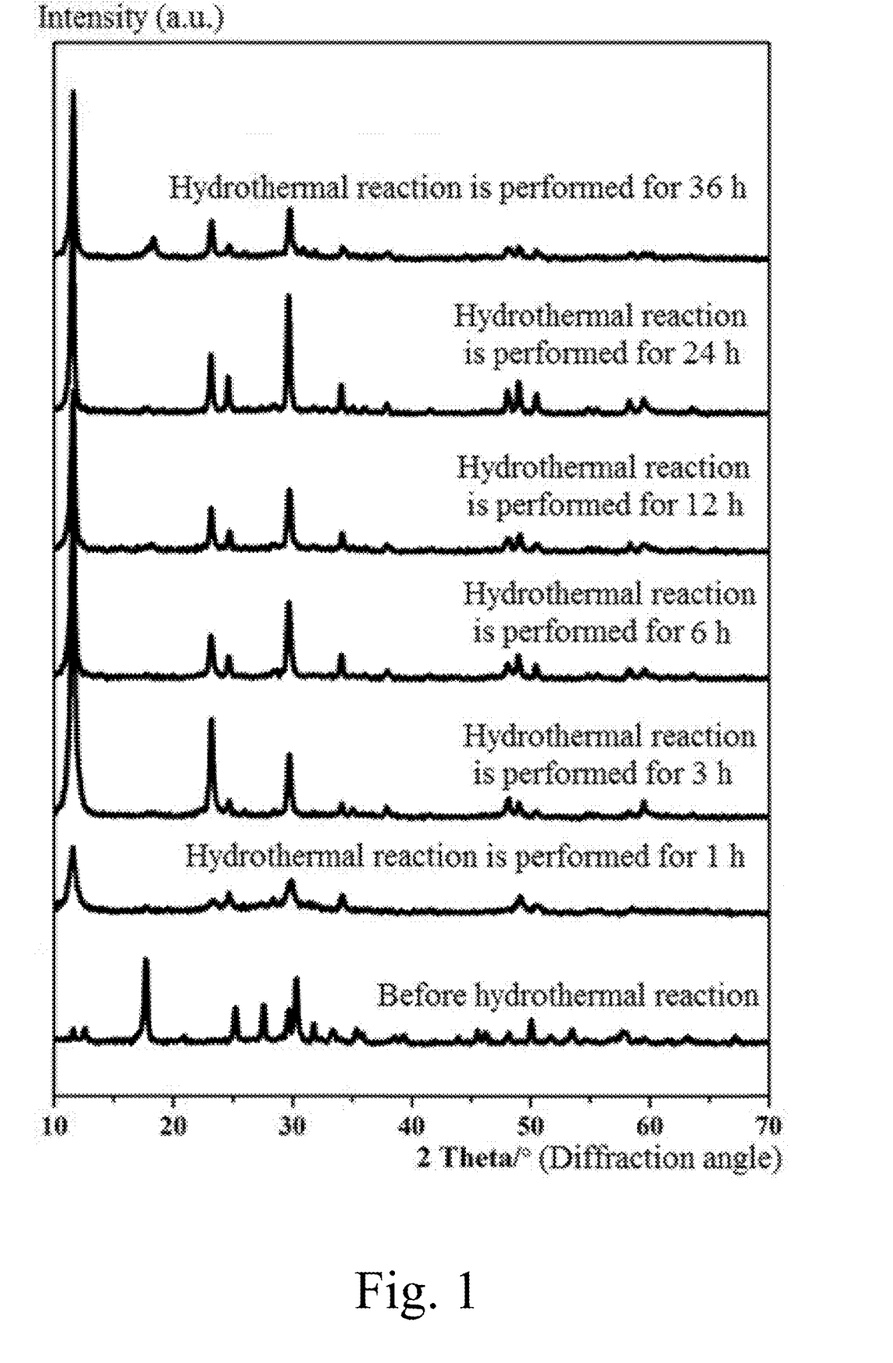
FIG. 1 is an XRD (X-ray diffraction) pattern of a product when a mass ratio of $NaVO_3$ to $Na_2S.9H_2O$ is 1:1, a hydrothermal reaction is performed at 180° C. for 1 h, 3 h, 6 h, 12 h, 24 h and 36 h, respectively.

FIG. 1 is an XRD (X-ray diffraction) pattern of a product when a mass ratio of $NaVO_3$ to $Na_2S.9H_2O$ is 1:1, a hydrothermal reaction is performed at 180° C. for 1 h, 3 h, 6 h, 12 h, 24 h and 36 h, respectively. It can be seen from FIG. 1 that a pure phase $NaV_2O_5 \cdot H_2O$ is able to be synthesized in a reaction time interval of 1 to 36 h.

Figure 2:
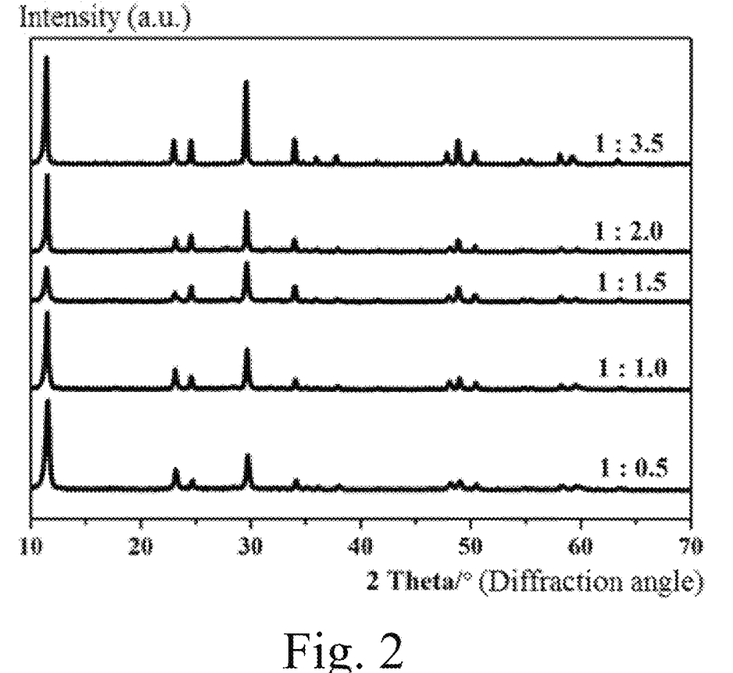
FIG. 2 is an XRD pattern of a product when a hydrothermal reaction is performed at 180° C. for 24 h, and a mass ratio of $NaVO_3$ to $Na_2S.9H_2O$ is 1:0.5, 1:1.0, 1:1.5, 1:2.0 and 1:3.5, respectively.

FIG. 2 is an XRD pattern of a product when a hydrothermal reaction is performed at 180° C. for 24 h, and a mass ratio of $NaVO_3$ to $Na_2S \cdot 9H_2O$ is 1:0.5, 1:1.0, 1:1.5, 1:2.0 and 1:3.5, respectively. It can be seen from FIG. 2 that a pure phase $NaV_2O_5 \cdot H_2O$ is able to be synthesized in a mass interval of 1:0.5-1:3.5. However, when the mass ratio is decreased below 1:0 or increased above 1:3.5, a clear solution is obtained and no product is generated. Therefore, too high or too low mass ratio is adverse to the synthesis of $NaV_2O_5 \cdot H_2O$.

Figure 3:
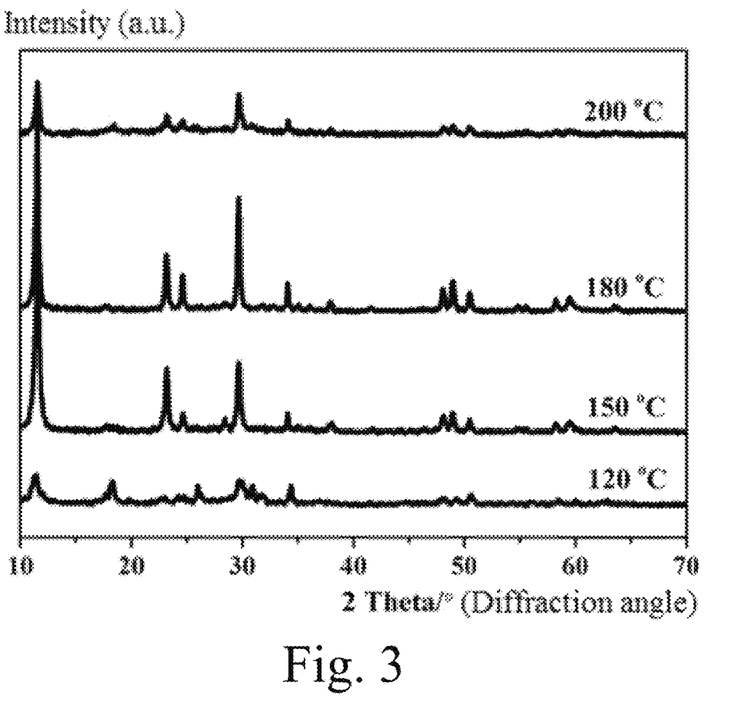
FIG. 3 is an XRD pattern of a product when a mass ratio of $NaVO_3$ to $Na_2S.9H_2O$ is 1:1, a hydrothermal reaction is performed for 24 h at 120° C., 150° C., 180° C. and 200° C., respectively.

FIG. 3 is an XRD pattern of a product when a mass ratio of $NaVO_3$ to $Na_2S \cdot 9H_2O$ is 1:1, a hydrothermal reaction is performed for 24 h at 120° C., 150° C., 180° C. and 200° C., respectively. It can be seen from FIG. 3 that a pure phase $NaV_2O_5 \cdot H_2O$ is able to be synthesized in a reaction temperature interval of 150-200° C. However, when the reaction temperature is decreased to 120° C., miscellaneous phase occurs in the synthesized product.

Figure 4:
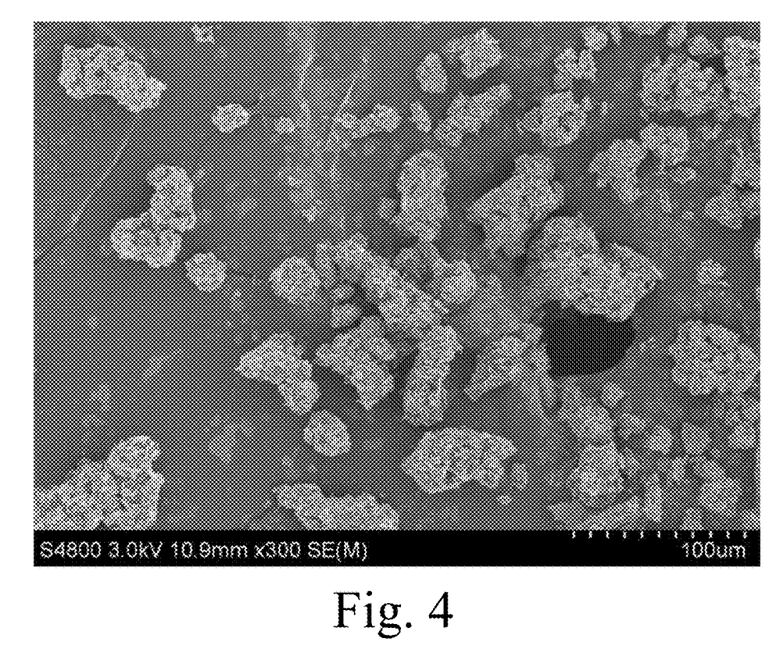
FIG. 4 is a low-magnification SEM (scanning electron microscopy) graph of a product prepared by a first embodiment of the present invention.

FIG. 4 is a low-magnification SEM (scanning electron microscope) graph of the product prepared by the first embodiment. It can be seen from FIG. 4 that the $NaV_2O_5 \cdot H_2O$ nanosheet-like powder is formed by aggregates with various sizes which are assembled by nanosheets.

Figure 5:
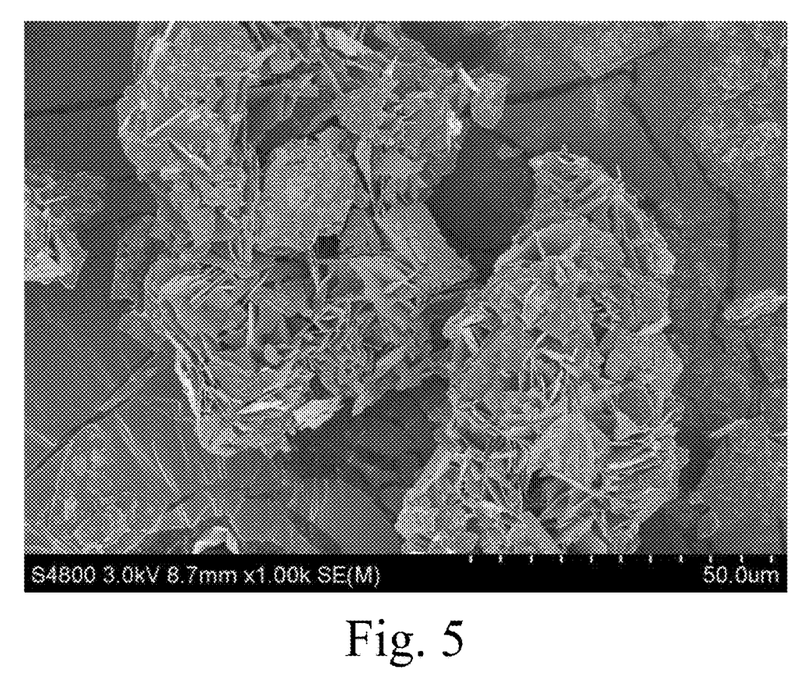
FIG. 5 is a high-magnification SEM graph of the product prepared by the first embodiment of the present invention.

FIG. 5 is a high-magnification SEM graph of the product prepared by the first embodiment of the present invention. It can be seen from FIG. 5 that the $NaV_2O_5 \cdot H_2O$ aggregates are self-assembled from standing nanosheets.

Figure 6:
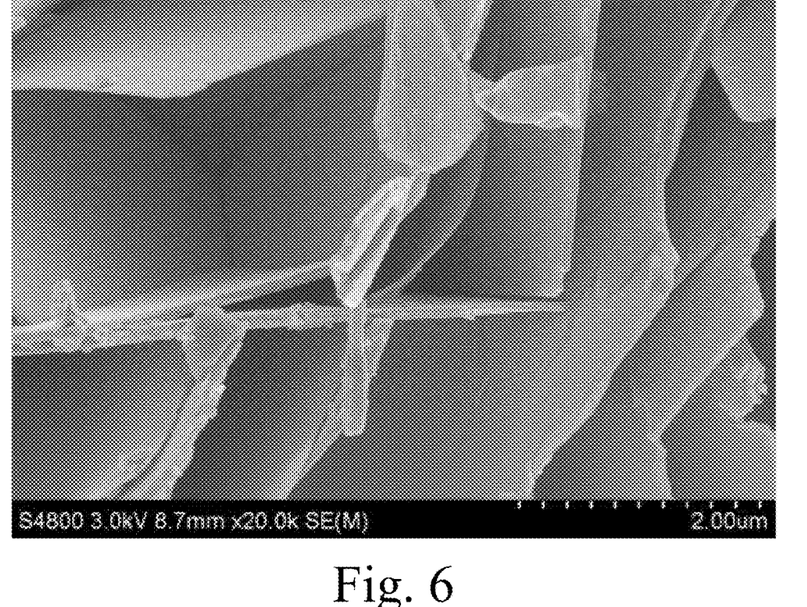
FIG. 6 is an ultrahigh-magnification SEM graph of the product prepared by the first embodiment of the present invention.

FIG. 6 is an ultrahigh-magnification SEM graph of the product prepared by the first embodiment of the present invention. It can be seen from FIG. 6 that each of the $NaV_2O_5 \cdot H_2O$ nanosheets has a thickness in a range of 30-60 nm and a smooth surface.

Figure 7:
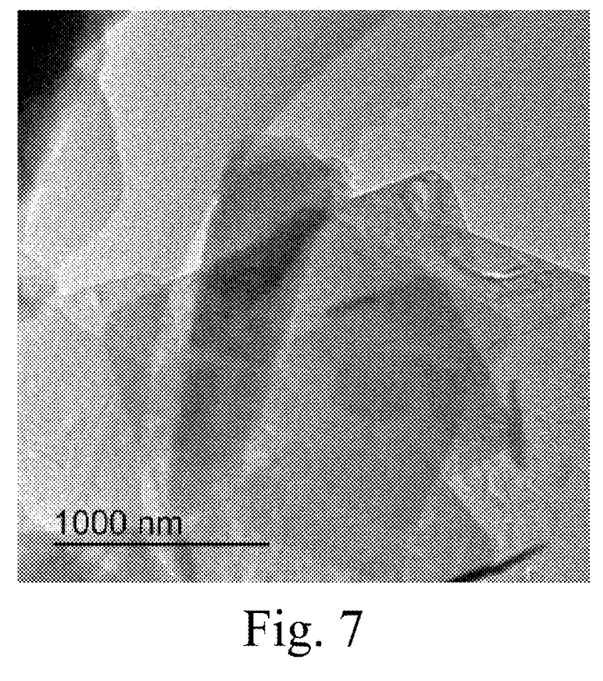
FIG. 7 is a low-magnification TEM (transmission electron micrograph) of the product prepared by the first embodiment of the present invention.

FIG. 7 is a low-magnification TEM (transmission electron micrograph) of the product prepared by the first embodiment of the present invention. It can be seen from FIG. 7 that the nanosheets are transparent under a projection electron microscope, indicating that the nanosheets have a small thickness. Therefore, the nanosheets seen under scanning electron microscope are formed in a stacked manner of nano sub-sheets with a smaller thickness.

Figure 8:
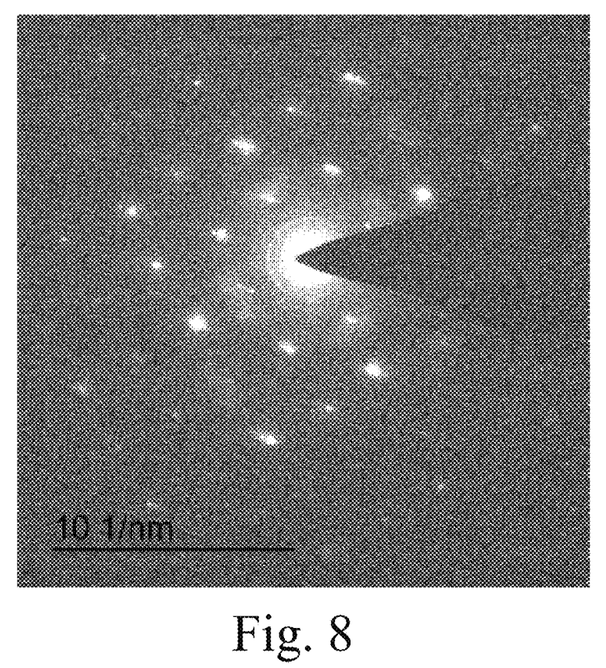
FIG. 8 is a diffraction dot-matrix pattern of the product prepared by the first embodiment of the present invention.

FIG. 8 is a diffraction dot-matrix pattern of the product prepared by the first embodiment of the present invention. It can be seen from FIG. 8 that $NaV_2O_5 \cdot H_2O$ has a tetragonal phase crystal structure, and simultaneously, the dot-matrix structure shows that the nanosheet is a single crystal structure.

Figure 9:
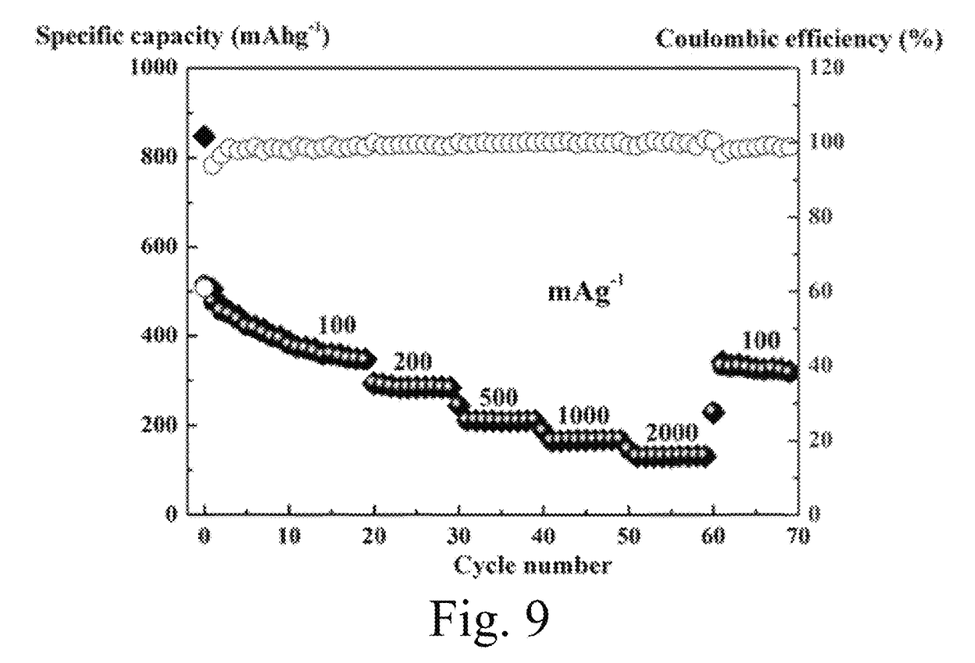
FIG. 9 is a magnification performance chart when the product prepared by the first embodiment of the present invention acts as an anode material of a lithium ion battery.

FIG. 9 is a magnification performance chart when the product prepared by the first embodiment of the present invention acts as an anode material of a lithium ion battery. It can be seen from FIG. 9 that at a current density of 100, 200, 500, 1000 and 2000 $mAg^{-1}$, a specific capacity can reach 348, 285, 209, 167 and 130 $mAhg^{-1}$, respectively. After experiencing high magnification performance testing, when the current density returns to 100 $mAg^{-1}$, the specific capacity can still reach 328 $mAhg^{-1}$, and a capacity retention rate can reach 94%.

Figure 10:
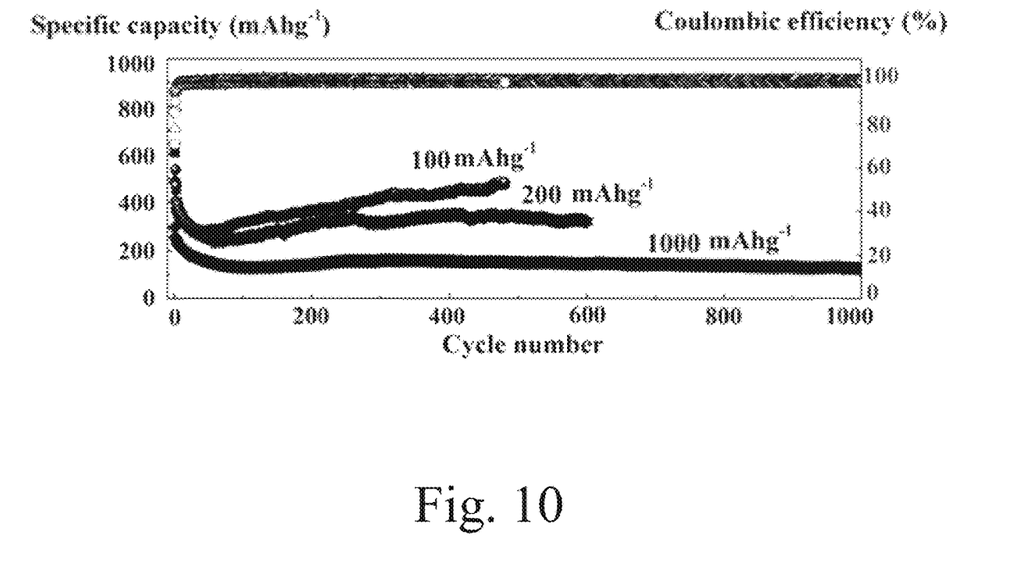
FIG. 10 is a cycle performance chart when the product prepared by the first embodiment of the present invention acts as the anode material of the lithium ion battery.

FIG. 10 is a cycle performance chart when the product prepared by the first embodiment of the present invention acts as the anode material of the lithium ion battery. It can be seen from FIG. 10 that at the current density of 100 and 200 $mAg^{-1}$, a first discharge capacity can reach 859 and 633 $mAhg^{-1}$, respectively; after 480 and 600 cycles, the specific capacity can still reach 483 and 320 $mAhg^{-1}$, respectively; and after 1000 cycles at the current density of 1000 $mAg^{-1}$, the specific capacity can still reach 129 $mAhg^{-1}$.

Fourteenth Embodiment

Step 1: Simultaneously add 0.8 g of $NaVO_3$ and 2 g of $Na_2S \cdot 9H_2O$ into 65 ml of deionized water, and then magnetically stir at a rotational speed of 800 r/min for 65 min, and then obtain a black turbid solution;

Step 2: Seal after putting the black turbid solution into a reaction lining according to a filling ratio of 65%, fix the sealed reaction lining in a reaction kettle, place the reaction kettle into a homogeneous reactor, and then heat under a rotational speed of 5 r/min from a room temperature to 140° C., and then perform a hydrothermal reaction for 36 h; and Step 3: After completing the hydrothermal reaction, naturally cool the reaction kettle to the room temperature, and then alternately clean for three times through water and alcohol by suction filtration, and then collect a product by suction filtration, dry the product at 40° C., and finally obtain a tetragonal $NaV_2O_5 \cdot H_2O$ nanosheet-like powder.

Fifteenth Embodiment

Step 1: Simultaneously add 1.2 g of $NaVO_3$ and 1.0 g of $Na_2S \cdot 9H_2O$ into 55 ml of deionized water, and then magnetically stir at a rotational speed of 900 r/min for 60 min, and then obtain a black turbid solution;

Step 2: Seal after putting the black turbid solution into a reaction lining according to a filling ratio of 55%, fix the sealed reaction lining in a reaction kettle, place the reaction kettle into a homogeneous reactor, and then heat under a rotational speed of 15 r/min from a room temperature to 190° C., and then perform a hydrothermal reaction for 1 h; and Step 3: After completing the hydrothermal reaction, naturally cool the reaction kettle to the room temperature, and then alternately clean for five times through water and alcohol by suction filtration, and then collect a product by suction filtration, dry the product at 80° C., and finally obtain a tetragonal $NaV_2O_5 \cdot H_2O$ nanosheet-like powder.

What is claimed is:

1. A preparation method of a tetragonal $NaV_2O_5 \cdot H_2O$ nanosheet-like powder used as an anode material of a lithium ion battery, wherein:

the tetragonal $NaV_2O_5 \cdot H_2O$ nanosheet-like powder has a thickness in a range of 30-60 nm and a layer spacing of 7.71 Å, and is a single crystal layered structure grown along a (002) crystal orientation;

when the tetragonal $NaV_2O_5 \cdot H_2O$ nanosheet-like powder acts as the anode material of the lithium ion battery, at a current density of 100, 200, 500, 1000 and 2000 $mAg^{-1}$, a capacity reaches 348, 285, 209, 167 and 130 $mAhg^{-1}$, respectively; at the current density of 100 and 200 $mAg^{-1}$, a first discharge capacity reaches 859 and 633 $mAhg^{-1}$, respectively; and after 480 and 600 cycles, the capacity reaches 483 and 320 $mAhg^{-1}$, respectively; and after 1000 cycles at the current density of 1000 $mAg^{-1}$, the capacity reaches 129 $mAhg^{-1}$;

the preparation method comprises the steps of:

(Step 1) simultaneously adding 0.8-1.2 g of $NaVO_3$ and 0.5-3.5 g of $Na_2S \cdot 9H_2O$ into 55-65 ml of deionized water, and then magnetically stirring, and obtaining a black turbid solution;

(Step 2) sealing after putting the black turbid solution into an inner lining of a reaction kettle according to a filling ratio in a range of 55-65%, fixing the sealed inner lining in an outer lining of the reaction kettle, placing the reaction kettle into a homogeneous reactor, and then heating under a rotational speed in a range of 5-15 r/min from a room temperature to 150-200° C., and then performing a hydrothermal reaction; and (Step 3) after completing the hydrothermal reaction, naturally cooling the reaction kettle to the room temperature, and then alternately cleaning through water and alcohol, and then collecting a product, and drying the product at 40-80° C., thereby obtaining the tetragonal $NaV_2O_5 \cdot H_2O$ nanosheet-like powder.

2. The preparation method according to claim 1, wherein in the step of (Step 1), the magnetic stirring is performed for 55-65 min under a rotational speed in a range of 800-1000 r/min.

3. The preparation method according to claim 2, wherein in the step of (Step 2), the hydrothermal reaction is performed for 1-36 h.

4. The preparation method according to claim 3, wherein in the step of (Step 3), the alternate cleaning is performed by suction filtration or centrifugation for 3-6 times, and the collecting is performed by suction filtration or centrifugation.

* * * * *